(12) United States Patent
Felt et al.

(10) Patent No.: US 9,602,776 B2
(45) Date of Patent: Mar. 21, 2017

(54) ACCESSING WEB-BASED CAMERAS ARRANGED BY CATEGORY

(75) Inventors: Michelle Felt, Randolph, NJ (US);
Nader Gharachorloo, Ossining, NY (US); Afshin Moshrefi, Newburyport, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1021 days.

(21) Appl. No.: 12/698,388

(22) Filed: Feb. 2, 2010

(65) Prior Publication Data

US 2011/0187865 A1 Aug. 4, 2011

(51) Int. Cl.
*H04N 7/18* (2006.01)

(52) U.S. Cl.
CPC ..................... *H04N 7/18* (2013.01)

(58) Field of Classification Search
CPC .... G06F 17/3087; H04N 17/18; H04N 5/225; H04W 4/02
See application file for complete search history.

(56) References Cited

U.S. PATENT DOCUMENTS

| | | | |
|---|---|---|---|
| 7,782,363 B2 * | 8/2010 | Ortiz ........................... | 348/211.8 |
| 8,230,037 B2 * | 7/2012 | Story et al. ................... | 709/217 |
| 2003/0074129 A1 * | 4/2003 | Curbow ................. | G01C 21/26 |
| | | | 701/523 |
| 2005/0186915 A1 * | 8/2005 | Williams ................... | 455/67.11 |
| 2007/0076094 A1 * | 4/2007 | Dickerson et al. ........... | 348/143 |
| 2007/0188612 A1 * | 8/2007 | Carter ........................... | 348/157 |
| 2008/0151049 A1 * | 6/2008 | McCubbrey et al. ........ | 348/143 |
| 2008/0168503 A1 * | 7/2008 | Sparrell .......................... | 725/58 |
| 2009/0009605 A1 * | 1/2009 | Ortiz ............................. | 348/157 |
| 2009/0216446 A1 * | 8/2009 | Ma et al. ....................... | 701/213 |
| 2010/0058248 A1 * | 3/2010 | Park ...................... | G06F 3/0481 |
| | | | 715/851 |
| 2010/0293173 A1 * | 11/2010 | Chapin et al. ................ | 707/759 |

OTHER PUBLICATIONS

EarthCam (labelled A1); "EarthCam Advanced Search"; Oct. 6, 2007; Retrieved Sep. 15, 2014 via http://web.archive.org/web/20071006052551/http://search.earthcam.com/search/advanced_search.php; p. 1.*
EarthCam (labelled A2); "EarthCam Search Results"; Retrieved Sep. 15, 2014 via http://search.earthcam.com/search/adv_search.php?lang=en&redirect=yes&title=&restrict=1&url=&subcat[]=e&city=&zip=; pp. 1-2.*

(Continued)

*Primary Examiner* — Scott B Christensen
*Assistant Examiner* — Thomas Richardson

(57) ABSTRACT

A device receives category information associated with multiple cameras, and receives video information from the multiple cameras. The device also arranges the video information based on the category information associated with the multiple cameras and based on location information associated with a user device. The device further receives a video request from the user device, and provides, to the user device, video information from a camera, of the multiple cameras, that matches the video request.

19 Claims, 15 Drawing Sheets

100 ⟶

(56) References Cited

OTHER PUBLICATIONS

EarthCam (labelled A3); "EarthCam Help Desk"; Oct. 6, 2007; Retrieved Sep. 16, 2014 via http://web.archive.org/web/20070702083254/http://search.earthcam.com/myec/help/article.php?id=55; p. 1.*

EarthCam (labelled A4); "EarthCam New Features"; Oct. 6, 2007; Retrieved Sep. 16, 2014 via http://web.archive.org/web/20071006095440/http://www.earthcam.com/site/newfeatures.php; pp. 1-2.*

BusinessWire; "EarthCam Mobile Delivers New Live Webcam Conten at CTIA Wireless 2008"; Apr. 1, 2008; Retrieved Sep. 16, 2014 via http://www.businesswire.com/news/home/20080401006537/en/EarthCam-Mobile-Delivers-Live-Webcam-Content-CTIA#.VBiNkRanSHg; pp. 1-2.*

\* cited by examiner

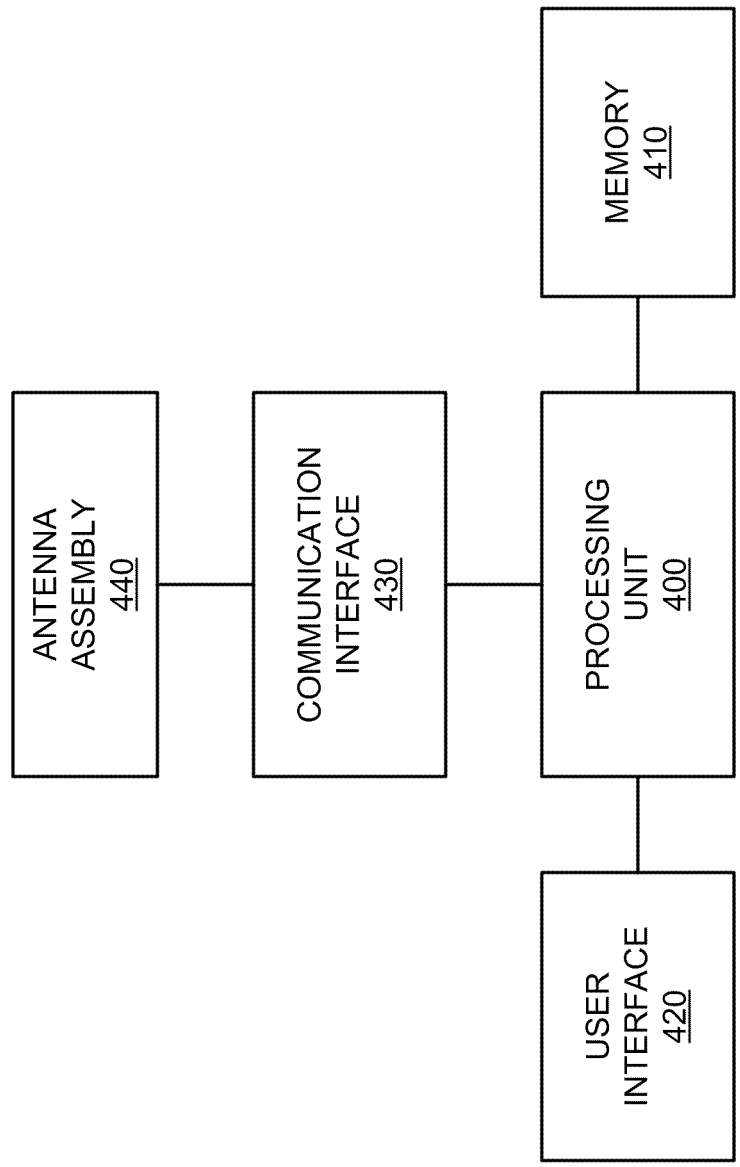

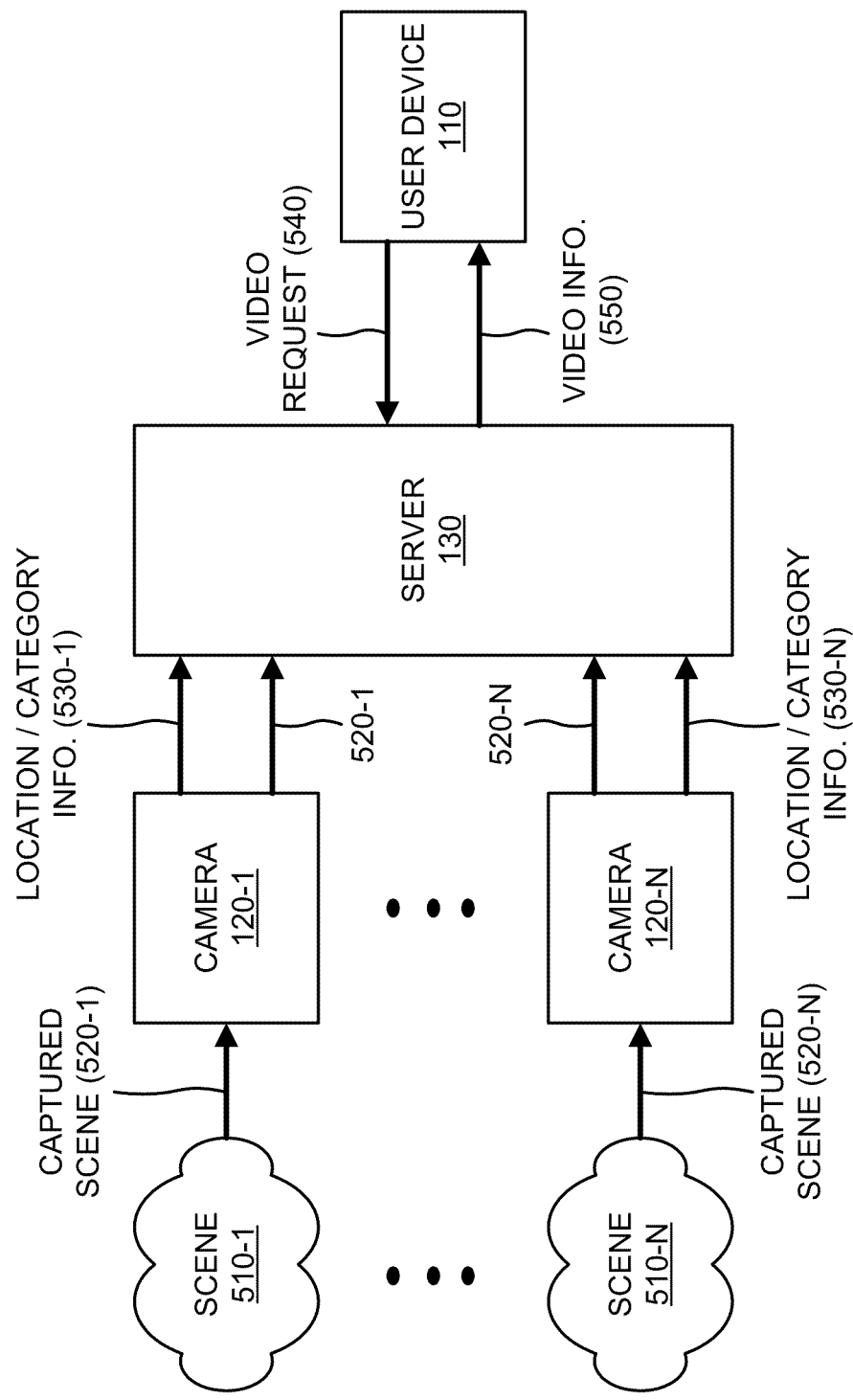

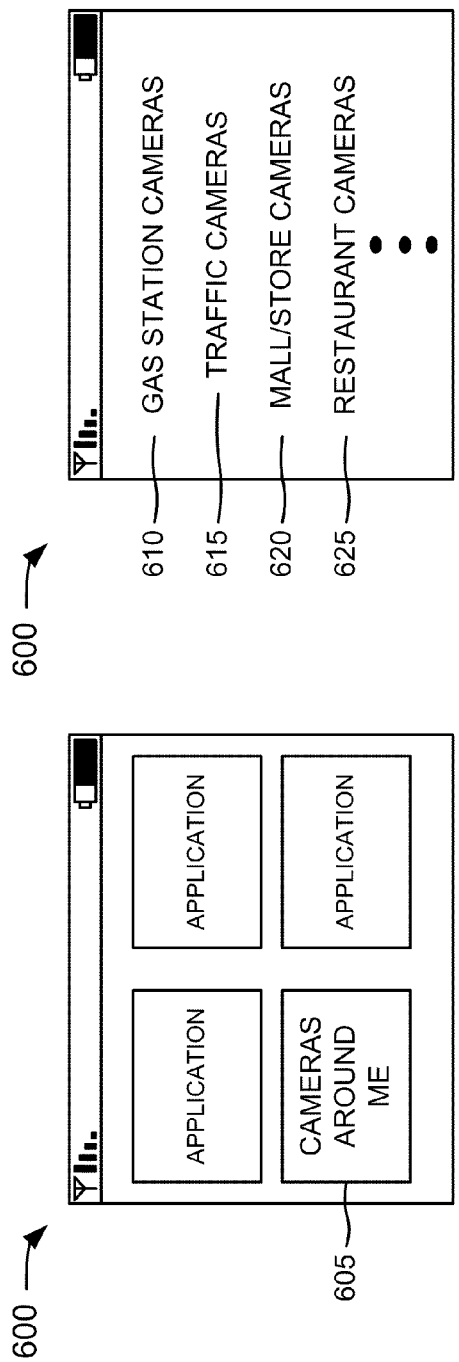
FIG. 6A
FIG. 6B
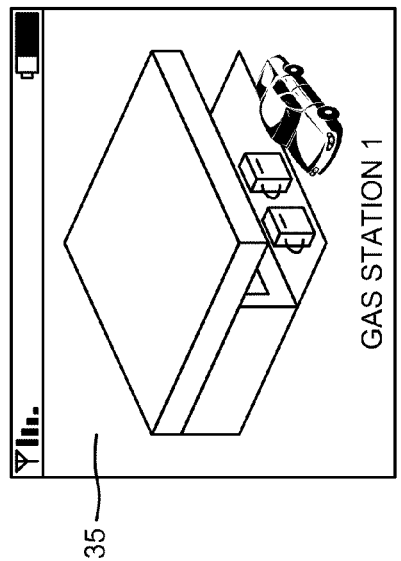
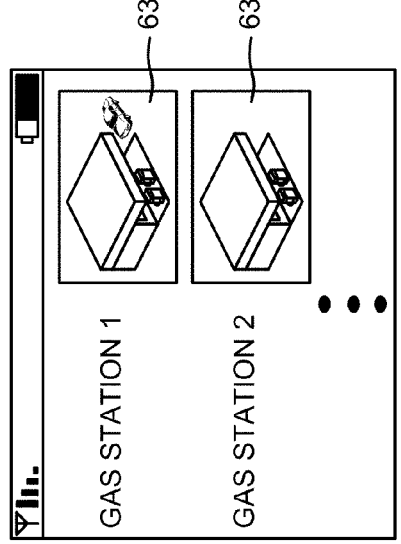
FIG. 6C
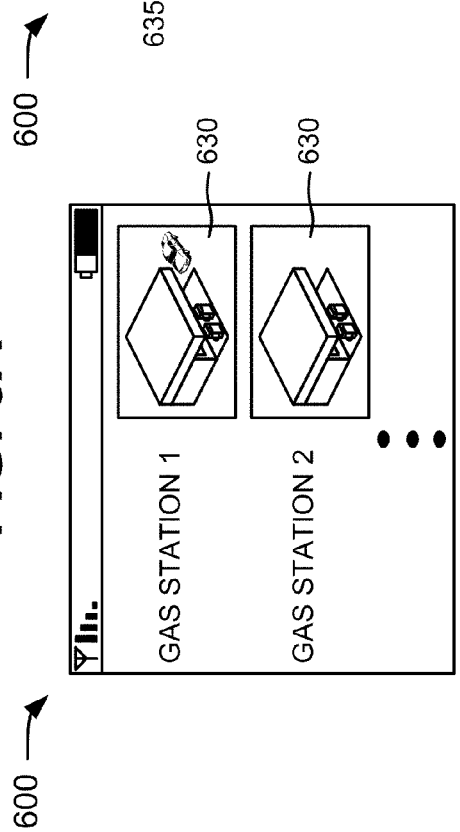
FIG. 6D

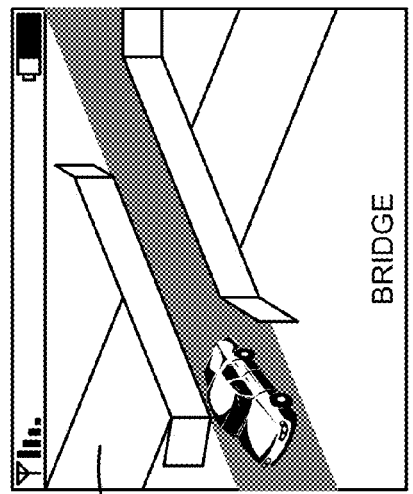
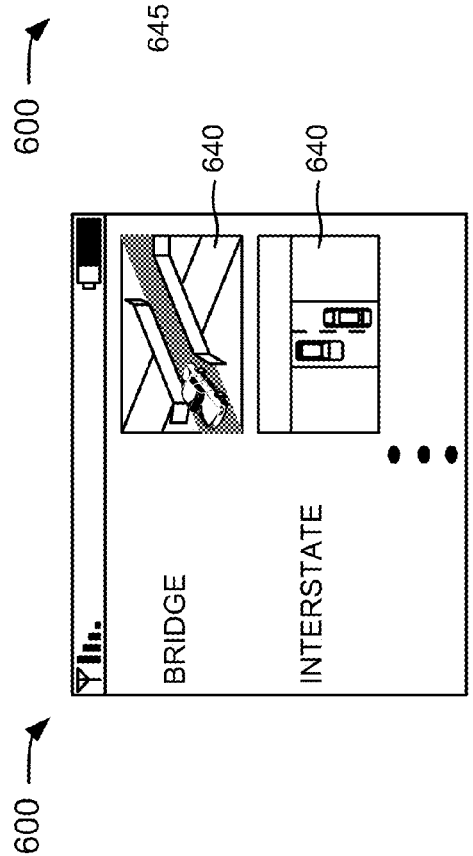
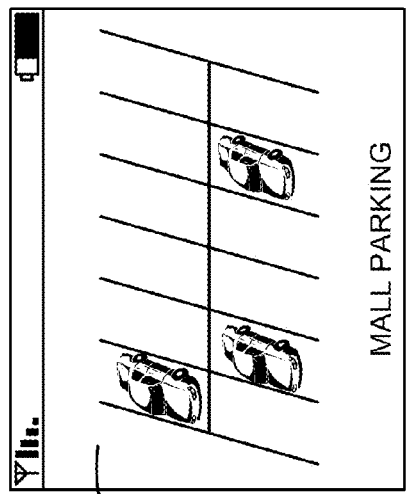
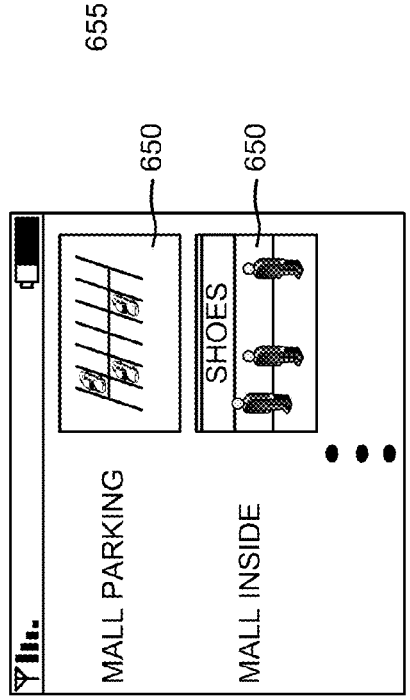
FIG. 6E
FIG. 6F
FIG. 6G
FIG. 6H

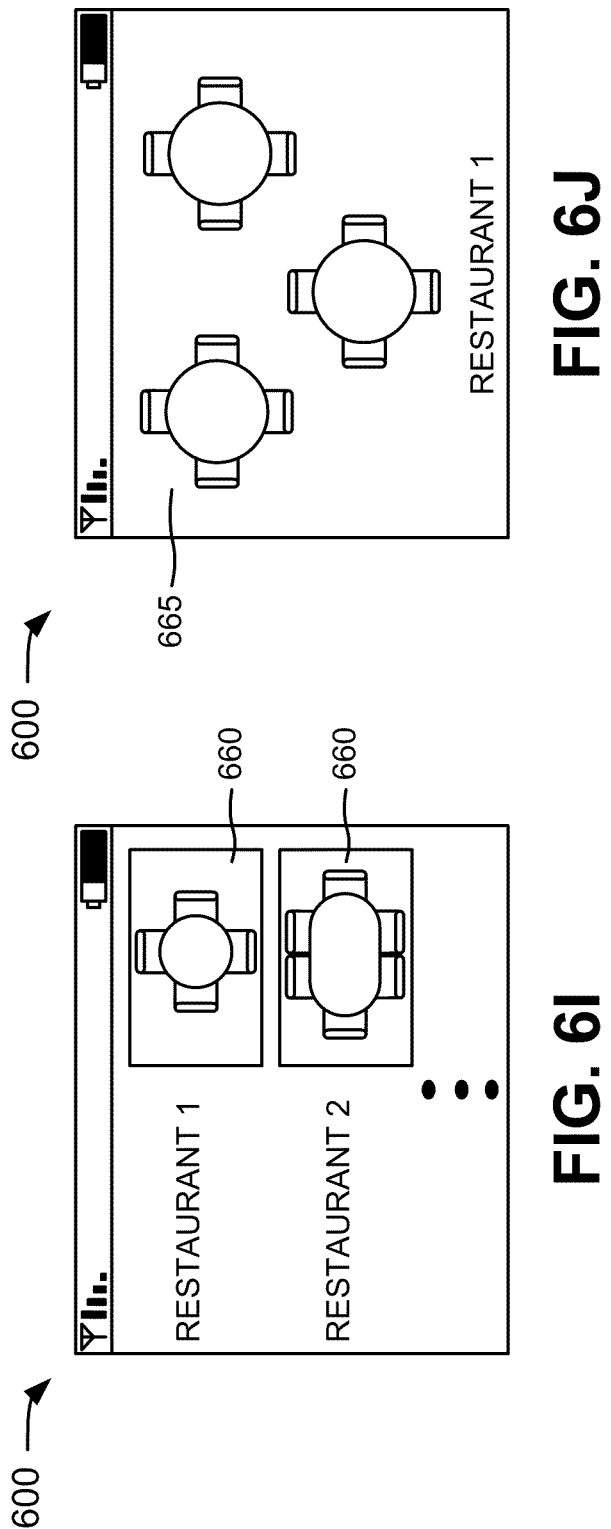

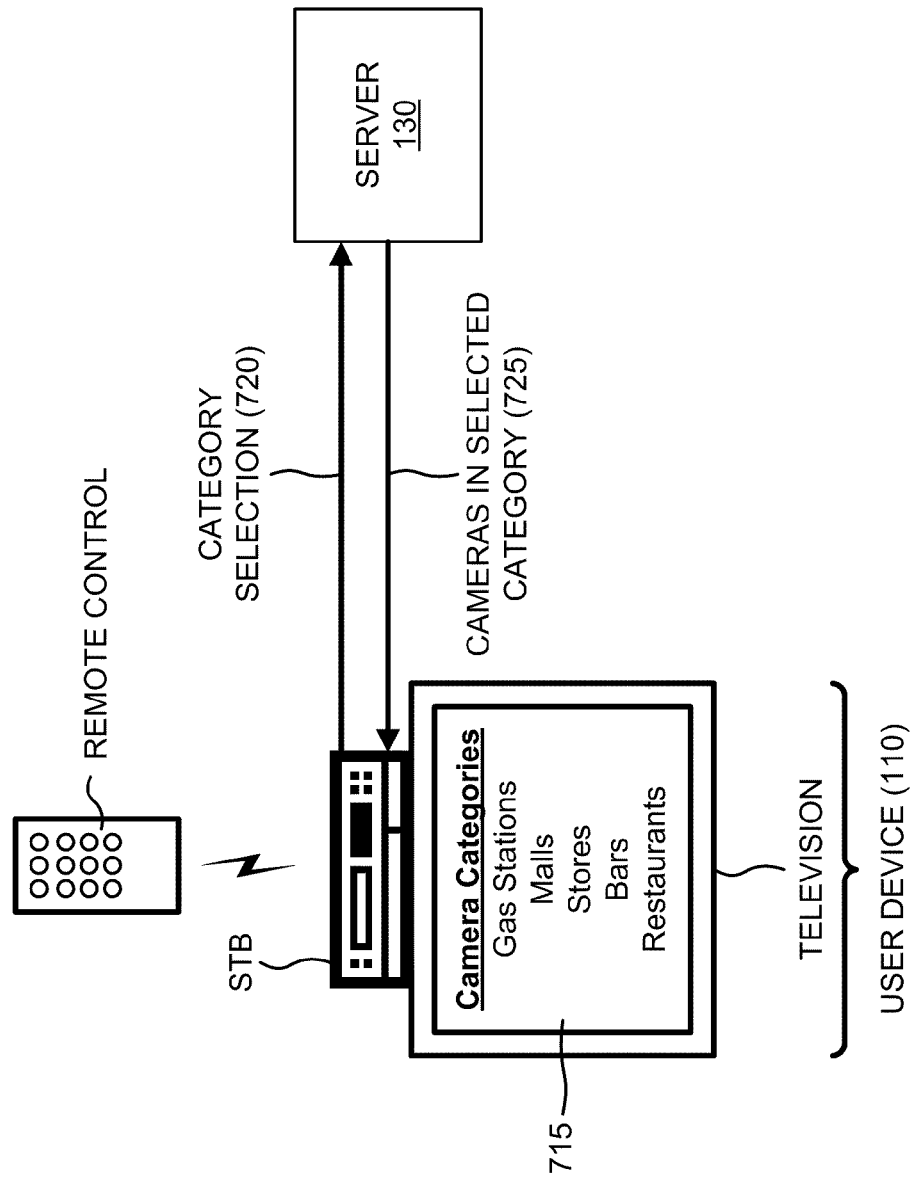

ACCESSING WEB-BASED CAMERAS ARRANGED BY CATEGORY

BACKGROUND

Currently, cameras are provided in various locations and may be accessed via the Internet (e.g., via the worldwide web). For example, cameras capturing traffic in a particular region may be accessed via the Internet so that a person (e.g., a commuter) may determine what driving conditions will be like on the way to work. Such cameras may be accessed using mobile communication devices (e.g., cell phones, personal digital assistants (PDAs), etc.), home computers, laptops, etc.

BRIEF DESCRIPTION OF THE DRAWINGS

FIG. 4 is a diagram of exemplary internal components of the user device depicted in FIG. 3;

FIG. 5 is a diagram of exemplary operations capable of being performed by an exemplary portion of the network depicted in FIG. 1;

FIGS. 6A-6J are diagrams of exemplary user interfaces capable of being generated by the user device depicted in FIG. 1;

FIGS. 7A-7D are diagrams of exemplary operations capable of being performed by an exemplary portion of the network depicted in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user device to access web-based cameras that are arranged by category (e.g., based on the locations of the user device and/or the cameras). In one implementation, for example, the systems and/or methods may receive location information and/or category information associated with multiple cameras, and may receive video information from the cameras. The systems and/or methods may arrange the video information based on the location/category information associated with the cameras. The systems and/or methods may receive a video request from a user device, and may provide, to the user device, video information from a camera that matches the video request.

As used herein, the term "user" is intended to be broadly interpreted to include a user device or a user of a user device.

Figure 1:
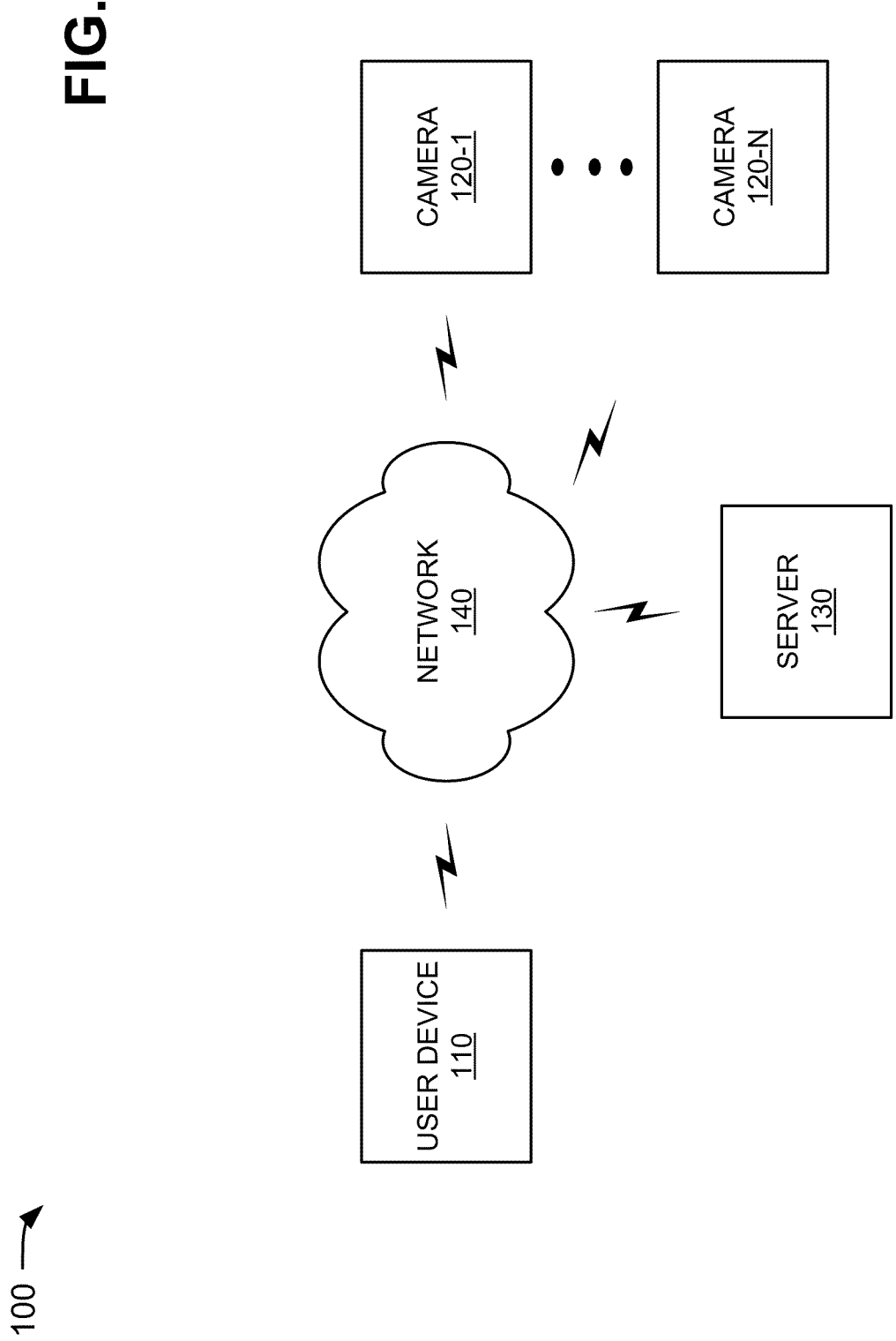
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include a user device 110, one or more cameras 120-1 through 120-N (collectively referred to as "cameras 120" and, in some instances, singularly as "camera 120"), and a server 130 interconnected by a network 140. Components of network 100 may interconnect via wired and/or wireless connections. Two cameras 120 and a single user device 110, server 130, and network 140 have been illustrated in FIG. 1 for simplicity. In practice, there may be more user devices 110, cameras 120, servers 130, and/or networks 140. Also, in some instances, one or more of the components of network 100 may perform one or more functions described as being performed by another one or more of the components of network 100.

User device 110 may include any device that is capable of accessing server 130 via network 140. For example, user device 110 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device (e.g., a wireless telephone), a cellular telephone, a smart phone, a laptop computer, a personal computer, a landline telephone, a global positioning system (GPS) navigation device, a set-top box (STB), a television, a remote control, a portable media player, or other types of computation or communication devices.

In one exemplary implementation, user device 110 may receive a list of camera categories (e.g., traffic cameras, parking lot cameras, cameras physically near user device 110, etc.) from server 130, and may enable a user to select one of the camera categories from the list of camera categories. User device 110 may receive, from server 130, a list of cameras 120 associated with the selected camera category, and may enable a user to select a camera 120 from the list of cameras 120. User device 110 may then receive video information from the selected camera 120 (e.g., via server 130).

Camera 120 may include a device that may capture and/or store audio, images, and/or video. Camera 120 may include a lens for capturing images and/or video, and may include a microphone for capturing audio.

Server 130 may include one or more server devices, or other types of computation or communication devices, that gather, process, search, and/or provide information in a manner described herein. In one exemplary implementation, server 130 may receive location information and/or category information associated with cameras 120, and may receive video information from cameras 120. Server 130 may arrange the video information based on the location/category information associated with cameras 120. Server 130 may receive a video request from user device 110, and may provide, to user device 110, video information from a camera 120 that matches the video request.

Network 140 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Figure 2:
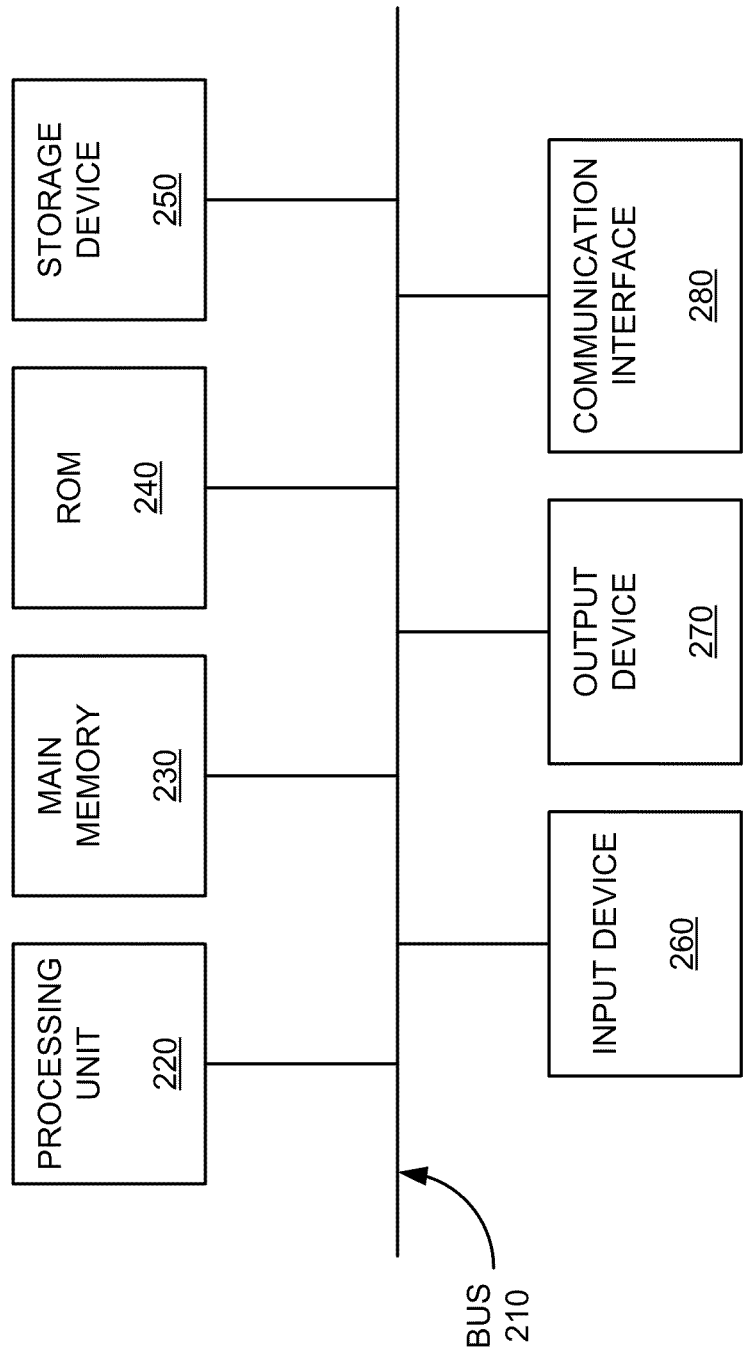
FIG. 2 is a diagram of exemplary components of a server depicted in FIG. 1.

FIG. 2 illustrates a diagram of exemplary components of a device 200 that may correspond to user device 110 (e.g., when user device 110 is a personal computer or a laptop computer) and/or server 130. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 140.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
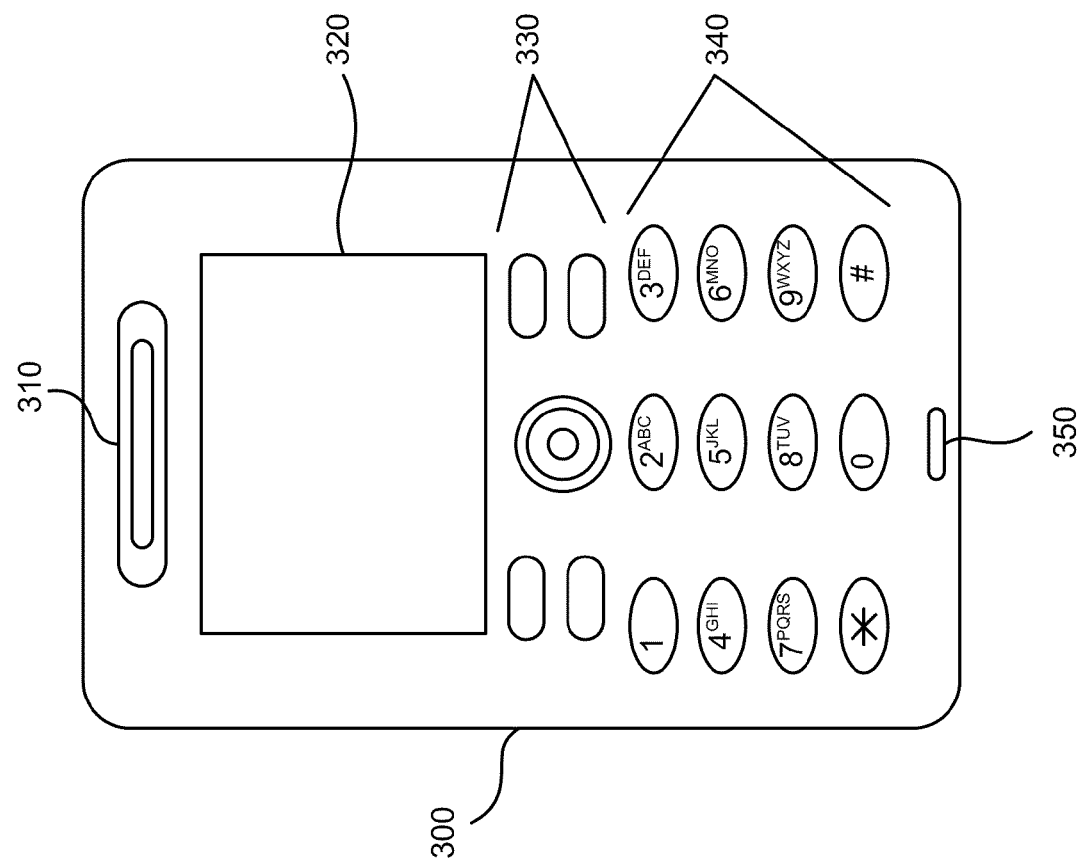
FIG. 3 is a diagram of an exemplary user device depicted in FIG. 1.

FIG. 3 depicts a diagram of an exemplary user device 110. As illustrated, user device 110 may include a housing 300, a speaker 310, a display 320, control buttons 330, a keypad 340, and/or a microphone 350. Housing 300 may protect the components of user device 110 from outside elements. Speaker 310 may provide audible information to a user of user device 110.

Display 320 may provide visual information to the user. For example, display 320 may display text input into user device 110; text, images, video, and/or graphics received from another device; and/or information regarding incoming or outgoing calls or text messages, emails, media, games, phone books, address books, the current time, directional assistance information (e.g., a telephone number and/or address of a residence or business), etc. In an exemplary implementation, display 320 may be a touch screen display that enables the user to manipulate (e.g., select) visual information presented on display 320.

Control buttons 330 may permit the user to interact with user device 110 to cause user device 110 to perform one or more operations. For example, control buttons 330 may be used to cause user device 110 to transmit information. Keypad 340 may include a standard telephone keypad. Microphone 350 may receive audible information from the user.

Although FIG. 3 shows exemplary components of user device 110, in other implementations, user device 110 may contain fewer components, different components, differently arranged components, or additional components than depicted in FIG. 3. In still other implementations, one or more components of user device 110 may perform one or more other tasks described as being performed by one or more other components of user device 110.

FIG. 4 illustrates a diagram of exemplary internal components of user device 110. As shown, user device 110 may include a processing unit 400, memory 410, a user interface 420, a communication interface 430, and/or an antenna assembly 440. Components of user device 110 may interconnect via wired and/or wireless connections.

Processing unit 400 may include one or more processors, microprocessors, application specific integrated circuits (ASICs), field programmable gate arrays (FPGAs), or the like. Processing unit 400 may control operation of user device 110 and its components. In one implementation, processing unit 400 may control operation of components of user device 110 in a manner described herein.

Memory 410 may include a RAM, a ROM, and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); and/or a vibrator to cause user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 140).

As will be described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of user device 110, in other implementations, user device 110 may contain fewer components, different components, differently arranged components, or additional components than depicted in FIG. 4. In still other implementations, one or more components of user device 110 may perform one or more other tasks described as being performed by one or more other components of user device 110.

FIG. 5 is a diagram of exemplary operations capable of being performed by an exemplary portion 500 of network 100. As shown, exemplary network portion 500 may include user device 110, cameras 120-1 through 120-N, and server 130. User device 110, cameras 120-1 through 120-N, and server 130 may include the features described above in connection with one or more of FIGS. 1-4.

As further shown in FIG. 5, each of cameras 120-1 through 120-N may be associated with a corresponding one of scenes 510-1 through 510-N (collectively referred to as "scenes 510" and, in some instances, singularly as "scene 510"). Scene 510 may include any scene capable of being captured by one of cameras 120. For example, scene 510 may include persons (e.g., customers at a restaurant, supermarket, bar, etc., and/or any person capable of being captured by one of cameras 120), places (e.g., buildings, roads, parking lots, bridges, restaurants, gas stations, bars, malls, stores, and/or any place capable of being captured by one of cameras 120), and/or things (e.g., motor vehicles in a parking lot, traffic on a road, and/or any thing capable of being captured by one of cameras 120).

Cameras 120-1 through 120-N may capture corresponding scenes 510-1 through 510-N, as indicated by reference numbers 520-1 through 520-N. In one exemplary implementation, cameras 120-1 through 120-N may continuously capture corresponding scenes 510-1 through 510-N. In another exemplary implementation, cameras 120-1 through 120-N may periodically capture corresponding scenes 510-1 through 510-N (e.g., for a particular time period). Cameras 120-1 through 120-N may provide captured scenes 520-1 through 520-N (e.g., as video streams) to server 130. Cameras 120-1 through 120-N may provide location information and/or category information 530-1 through 530-N to server 130. Location/category information 530-1 through 530-N may include locations associated with cameras 120-1 through 120-N (e.g., GPS coordinates associated with cameras 120-1 through 120-N); identification information (e.g., identifying cameras 120-1 through 120-N); categories associated with cameras 120-1 through 120-N (e.g., categories, such as traffic cameras, cameras in stores, gas station cameras, parking lot cameras, cameras in bars, cameras in restaurants, etc.); etc.

Server 130 may receive captured scenes 520-1 through 520-N and location/category information 530-1 through 530-N, and may arrange captured scenes 520-1 through 520-N based on location/category information 530-1 through 530-N. For example, server 130 may group video feeds from all traffic cameras 120 into a category, may group video feeds from all parking lot cameras 120 into a category, may group video feeds from all gas station cameras 120 into a category, etc. In an exemplary implementation, cameras 120-1 through 120-N may be registered with server 130 and may provide location/category information 530-1 through 530-N to server 130 prior to server 130 receiving captured scenes 520-1 through 520-N. Such an arrangement may enable server 130 to categorize cameras 120-1 through 120-N prior to server 130 receiving captured scenes 520-1 through 520-N. In another exemplary implementation, server 130 may not receive category information from cameras 120-1 through 120-N, but may receive location information from cameras 120-1 through 120-N. Server 130 may utilize the location information to categorize cameras 120-1 through 120-N. For example, if server 130 receives location information from a particular camera 120 (e.g. via GPS coordinates of the particular camera 120) provided in a supermarket, server 130 may compare the location information to a database (e.g., a database that includes address information, business listings, etc.) to determine information (e.g., a business name, such as a supermarket name) associated with the location information. Since the comparison of the particular camera 120 may provide a name of a supermarket, server 130 may categorize the particular camera 120 as a supermarket camera.

In another exemplary implementation, server 130 may receive location information from user device 110 (e.g., GPS coordinates of user device 110, an Internet protocol (IP) address of user device 110, registration information associated with user device 110, based on triangulation techniques, etc.), and may determine a location of user device 110 based on the location information. Server 130 may arrange captured scenes 520-1 through 520-N based on the location of user device 110 and/or based on location/category information 530-1 through 530-N. For example, if user device 110 is located in a particular metropolitan area, server 130 may determine that particular captured scenes 520 are from the particular metropolitan area, and may arrange the particular captured scenes 520 (e.g., into categories based on location category information 530). The categories of the particular captured scenes 520 may be provided to user device 110 for display to the user. In other words, server 130 may receive captured scenes from multiple cameras 120 and may tailor or refine the number of captured scenes provided to user device 110 based on the location of user device 110.

In one exemplary implementation, cameras 120 (e.g., cameras streaming over the Internet) may be registered with server 130 by executing an application on a GPS-enabled user device 110 (e.g., a mobile phone). For example, the application may register a particular camera 120 with server 130, and may mark a GPS location of the particular camera 120 (e.g., for provision in a camera registration database associated with server 130). After the particular camera 120 is registered, the GPS location of the particular camera 120 may be used (e.g., by server 130) to locate the particular camera 120 when user devices 110 are in a vicinity of the GPS location.

As further shown in FIG. 5, user device 110 may provide a video request 540 to server 130, and server 130 may receive video request 540. Video request 540 may include a request for video from a particular one of cameras 120. Server 130 may provide, to user device 110, video information 550 associated with a camera 120 that matches video request 540. Video information 550 may include a video feed from the matching camera 120. User device 110 may provide video information 550 for display to a user. In one example, video request 540 may include a request for video from a parking lot that is closest to user device 110. Server 130 may determine which cameras 120 are associated with parking lots, and may determine distances between the parking lot cameras 120 and user device 110 (e.g., based on GPS coordinates associated with user device 110 and the parking lot cameras 120). Server 130 may provide user device 110 with a video feed from the parking lot camera 120 that is determined to be closest to user device 110. Further details of how user device 110 requests and receives video information 550 from server 130 are provided below in connection with FIGS. 6A-7D.

In one exemplary implementation, video request 540 may include a location of user device 110 (e.g., GPS coordinates of user device 110, an IP address of user device 110, registration information associated with user device 110, etc.). Server 130 may receive video request 540 (e.g., including the location of user device 110), and may determine which cameras 120 are located a particular distance from the location of user device 110. Server 130 may provide, to user device 110, video information 550 from cameras 120 determined to be located a particular distance from the location of user device 110.

Although FIG. 5 shows exemplary components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

FIGS. 6A-6J are diagrams of exemplary user interfaces 600 capable of being generated by user device 110. User interfaces 600 may include graphical user interfaces (GUIs) or non-graphical user interfaces, such as text-based interfaces. User interfaces 600 may provide information to users via customized interfaces (e.g., proprietary interfaces) and/or other types of interfaces (e.g., browser-based interfaces, etc.). User interfaces 600 may receive user inputs via one or more input devices, may be user-configurable (e.g., a user may change the size of user interfaces 600, information displayed in user interfaces 600, color schemes used by user interfaces 600, positions of text, images, icons, windows, etc., in user interfaces 600, etc.), and/or may not be user-configurable. Information associated with user interfaces 600 may be selected by a user of user device 110 (e.g., via touch screen display 320, control buttons 330, and/or keypad 340 (FIG. 3)).

As shown in FIG. 6A, user interface 600 may present various applications to a user, such as a "Cameras Around Me" application 605. Application 605 may enable a user to view video feeds from cameras (e.g., cameras 120) that are provided proximate to user device 110 (e.g., within a predetermined distance from user device 110). If the user selects application 605, user interface 600 may present categorized cameras that are proximate to user device 110, as shown in FIG. 6B. In one exemplary implementation, server 130 may determine cameras 120 that are proximate to user device 110 (e.g., based on GPS coordinates associated with user device 110 and cameras 120), may categorize the determined cameras 120, and may provide the camera categories to user device 110. For example, as shown in FIG. 6B, user interface 600 may present a gas station cameras category 610, a traffic cameras category 615, a mall/store cameras category 620, a restaurant cameras category 625, etc. In another exemplary implementation, cameras 120 associated with the camera categories (e.g., categories 610-625) may not be proximate to user device 110.

If the user selects gas station cameras category 610, user interface 600 may present a list of gas station cameras 120, as shown in FIG. 6C. In one exemplary implementation, the list of gas station cameras 120 may be ranked or ordered (e.g., by server 130) based on proximity of the gas station cameras 120 to user device 110. In another exemplary implementation, the list of gas station cameras 120 may be arranged (e.g., by server 130) based on suppliers associated with the gas stations captured by the gas station cameras 120. For example, as shown in FIG. 6C, user interface 600 may present a list of gas station cameras 120 (e.g., "GAS STATION 1," "GAS STATION 2," etc.) and small video feeds 630 provided by the gas station cameras 120. If the user selects GAS STATION 1 (e.g., or its associated small video feed 630), user interface 600 may present a large video feed 635 provided by a camera 120 located at GAS STATION 1, as shown in FIG. 6D. Such an arrangement may enable the user to determine (e.g., via user device 110) how busy GAS STATION 1 is and/or what price GAS STATION 1 is charging for gasoline (e.g., via a sign provided at GAS STATION 1 that may be viewed via large video feed 635). This information may enable the user to determine whether to travel to GAS STATION 1 to buy gasoline.

If the user selects traffic cameras category 615 (FIG. 6B), user interface 600 may present a list of traffic cameras 120, as shown in FIG. 6E. In one exemplary implementation, the list of traffic cameras 120 may be ranked or ordered (e.g., by server 130) based on proximity of the traffic cameras 120 to user device 110. In another exemplary implementation, the list of traffic cameras 120 may be arranged (e.g., by server 130) based on types of traffic captured by the traffic cameras 120. For example, as shown in FIG. 6E, user interface 600 may provide a list of different types of traffic cameras 120 (e.g. for a BRIDGE, an INTERSTATE, etc.) and small video feeds 640 provided by the traffic cameras 120. If the user selects BRIDGE (e.g., or its associated small video feed 640), user interface 600 may present a large video feed 645 provided by a camera 120 located at BRIDGE, as shown in FIG. 6F. This may enable the user to determine (e.g., via user device 110) how much traffic is on BRIDGE, which may enable the user to determine whether to travel via BRIDGE.

If the user selects mall/store cameras category 620 (FIG. 6B), user interface 600 may present a list of mall/store cameras 120, as shown in FIG. 6G. In one exemplary implementation, the list of mall/store cameras 120 may be ranked or ordered (e.g., by server 130) based on proximity of the mall/store cameras 120 to user device 110. In another exemplary implementation, the list of mall/store cameras 120 may be arranged (e.g., by server 130) based on types of malls or stores captured by the mall/store cameras 120. For example, as shown in FIG. 6G, user interface 600 may provide a list of different types of mall/store cameras 120 (e.g. for MALL PARKING, MALL INSIDE, etc.) and small video feeds 650 provided by the mall/store cameras 120. If the user selects MALL PARKING (e.g., or its associated small video feed 650), user interface 600 may present a large video feed 655 provided by a camera 120 located at MALL PARKING, as shown in FIG. 6H. This may enable the user to determine (e.g., via user device 110) where empty parking spaces are located in MALL PARKING. In one example, user interface 600 may provide directions towards the empty parking spaces. In such an example, server 130 may determine the directions based on GPS coordinates associated with user device 110 and camera 120 located at MALL PARKING, and based on a video image detection technique (e.g., video image detection algorithms). Server 130 may provide the determined directions to user device 110 for display.

If the user selects restaurant cameras category 625 (FIG. 6B), user interface 600 may present a list of restaurant cameras 120, as shown in FIG. 6I. In one exemplary implementation, the list of restaurant cameras 120 may be ranked or ordered (e.g., by server 130) based on proximity of the restaurant cameras 120 to user device 110. In another exemplary implementation, the list of restaurant cameras 120 may be arranged (e.g., by server 130) based on types of restaurants (e.g., sandwich shops, pizza restaurants, etc.) captured by the restaurant cameras 120. For example, as shown in FIG. 6I, user interface 600 may provide a list of different types of restaurant cameras 120 (e.g. for RESTAURANT 1, RESTAURANT 2, etc.) and small video feeds 660 provided by the restaurant cameras 120. If the user selects RESTAURANT 1 (e.g., or its associated small video feed 660), user interface 600 may present a large video feed 665 provided by a camera 120 located at RESTAURANT 1, as shown in FIG. 6J. This may enable the user to determine (e.g., via user device 110) whether RESTAURANT 1 is crowded or busy.

Although user interfaces 600 of FIGS. 6A-6J depicts a variety of information, in other implementations, user interfaces 600 may depict less information, different information, differently arranged information, or additional information than depicted in FIGS. 6A-6J.

FIGS. 7A-7D are diagrams of exemplary operations capable of being performed by an exemplary portion 700 of network 100. As shown in FIGS. 7A-7D, exemplary network portion 700 may include user device 110, camera 120-1 (FIG. 7D only), and server 130. User device 110, camera 120-1, and server 130 may include the features described above in connection with one or more of FIGS. 1-6J.

As further shown in FIGS. 7A-7D, user device 110 may include a television, a STB, and a remote control. The television may include a television monitor that is capable of displaying television programming, content provided by the STB, and/or content provided by other devices (e.g., a digital video disk (DVD) player, a video camera, etc., not shown) connected to the television. The STB may include a device that receives content (e.g., categorical lists of cameras 120, video feeds from cameras 120, etc.), and provides the content to the television or another device. The STB may allow a user to alter the content provided to the television based on a signal (e.g., a channel up or channel down signal) received from the remote control. In one exemplary implementation, the STB may be incorporated directly within the television and/or may include a digital video recorder (DVR). The remote control may include a device that allows a user to control content displayed on the television via interaction with the television and/or the STB.

Figure 7A:
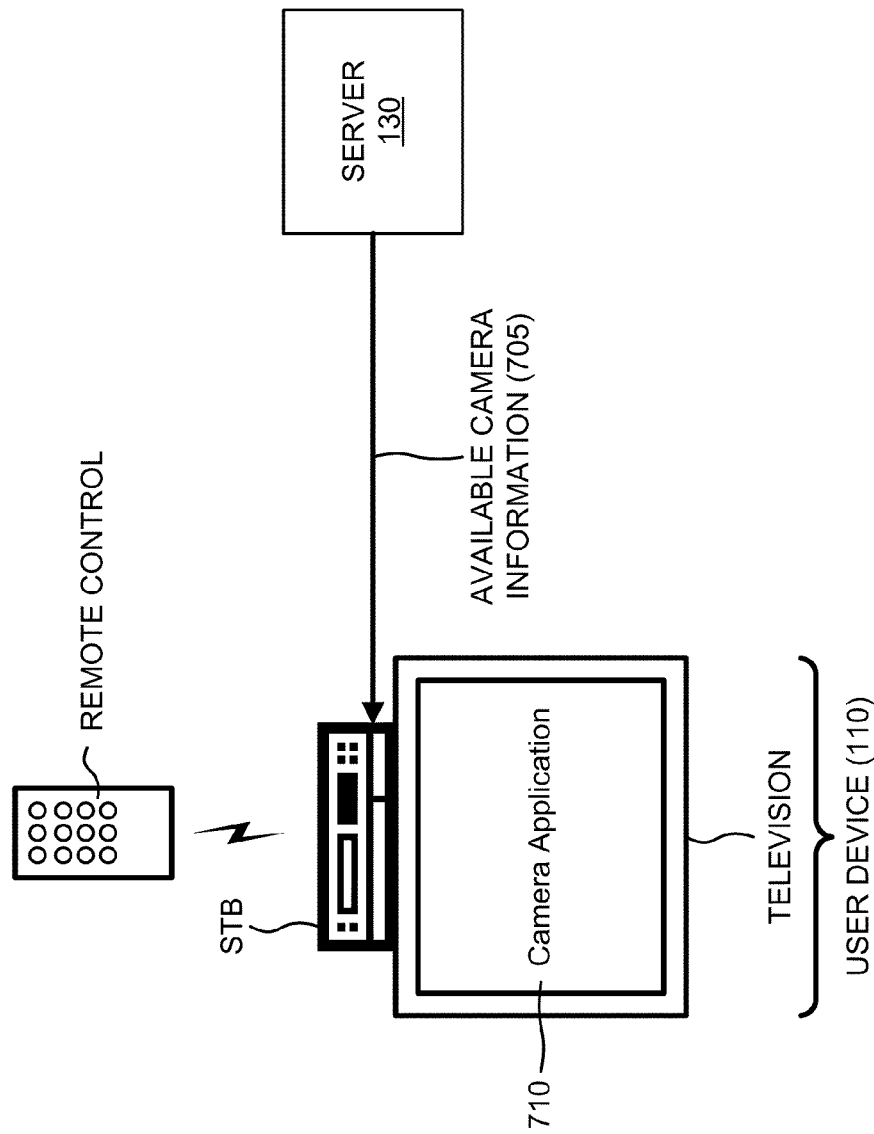

As further shown in FIG. 7A, server 130 may provide available camera information 705 to the STB, and the STB may store available camera information 705. Available camera information 705 may include information associated with cameras 120, such as, for example, locations of cameras 120, categories associated with cameras 120, etc. The STB may provide a camera application 710 for display on the television. Camera application 710 (e.g., when selected by the user via the remote control) may enable the user to view, manipulate, and/or select available camera information 705.

Figure 7C:
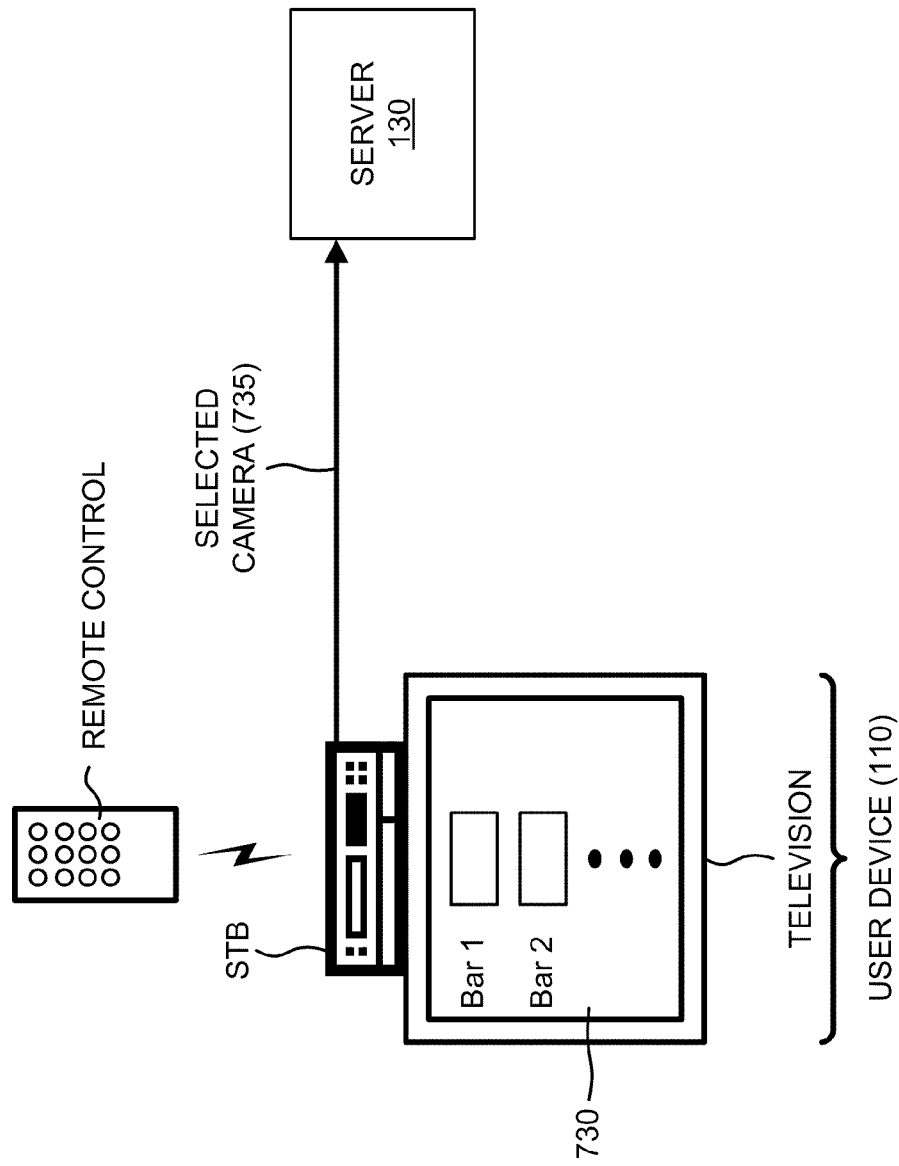

For example, if the user selects (e.g., via the remote control) camera application 710, the STB may provide camera categories 715 for the display on the television, as shown in FIG. 7B. Camera categories 715 may include a categorical listing of cameras 120 that may be accessed by the user. For example, as shown in FIG. 7B, camera categories may include a gas stations category, a malls category, a stores category, a bars category, a restaurants category, etc. The user (e.g., via the remote control) may select one of camera categories 715, and the STB may provide a category selection 720 to server 130. Server 130 may receive category selection 720, may determine cameras 120 associated with category selection 720, and may provide the determined cameras 120 (e.g., associated with category selection 720) to the STB, as indicated by reference number 725. For example, if the user (e.g., via the remote control) selects "Bars" from camera categories 715, server 130 may provide a list 730 of cameras 120 associated with "Bars" to the STB, as shown in FIG. 7C. In one example, list 730 of cameras 120 may include cameras 120 provided in bars (e.g., "Bar 1," "Bar 2," etc.) that are located a predetermined distance from the user (e.g., as determined based on location information associated with cameras 120 and the STB provided via GPS coordinates, IP addresses, triangulation techniques, etc.). In another example, the user may have previously created a list of "favorite" bars and list 730 of cameras 120 may include cameras 120 provided in the favorite bars.

Figure 7D:
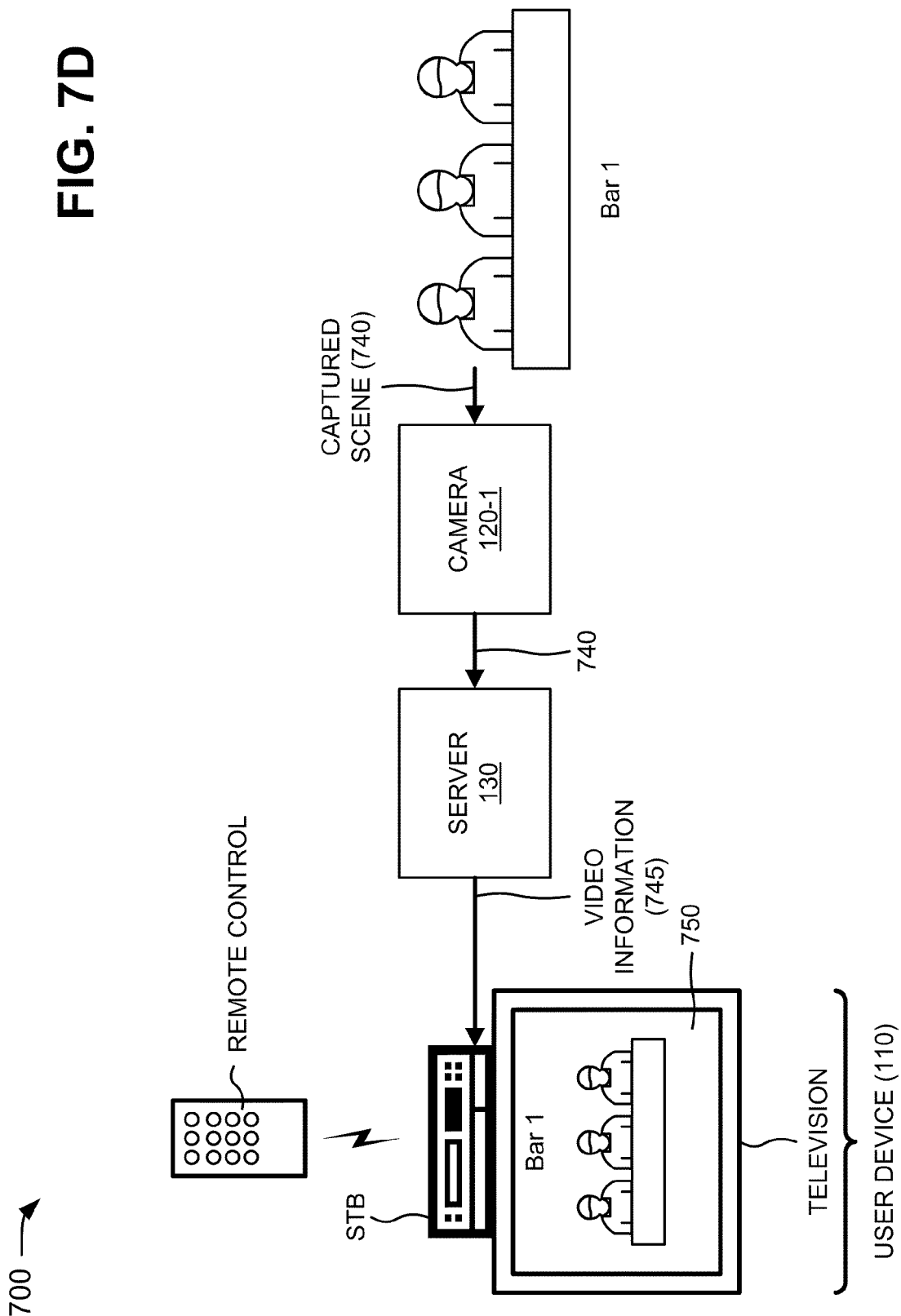

As further shown in FIG. 7C, if the user selects (e.g., via the remote control) a camera (e.g., camera 120-1) associated with "Bar 1" from list 730 of cameras 120, the STB may provide information associated with the selected camera to server 130, as indicated by reference number 735. As shown in FIG. 7D, based on selected camera 735, server 130 may receive a captured scene 740 (e.g., a video stream) from camera 120-1. Captured scene 740 may include video information 745 associated with "Bar 1." Video information 745 may include continuously captured video provided by camera 120-1 or periodically captured video provided by camera 120-1. Server 130 may provide video information 745 to the STB, and the STB may provide video information 745 for display on the television, as indicated by reference number 750.

The operations depicted in FIGS. 7A-7D may enable a user to monitor a variety of locations (e.g., gas stations, restaurants, stores, etc.) and/or situations (e.g., traffic conditions, parking conditions, etc.). This, in turn, may enable the user to make a variety of decisions (e.g., where to buy gas, where to eat dinner, what roads to travel, where to park, etc.) that may save the user time and aggravation. Although the operations depicted in FIGS. 7A-7D are provided via a television, STB, and remote control, in other implementations, the operations may be provided another type of user device 110, such as a personal computer or a laptop computer.

Although FIGS. 7A-7D show exemplary components of network portion 700, in other implementations, network portion 700 may contain fewer components, different components, differently arranged components, or additional components than depicted in FIGS. 7A-7D. Alternatively, or additionally, one or more components of network portion 700 may perform one or more other tasks described as being performed by one or more other components of network portion 700.

Figure 8:
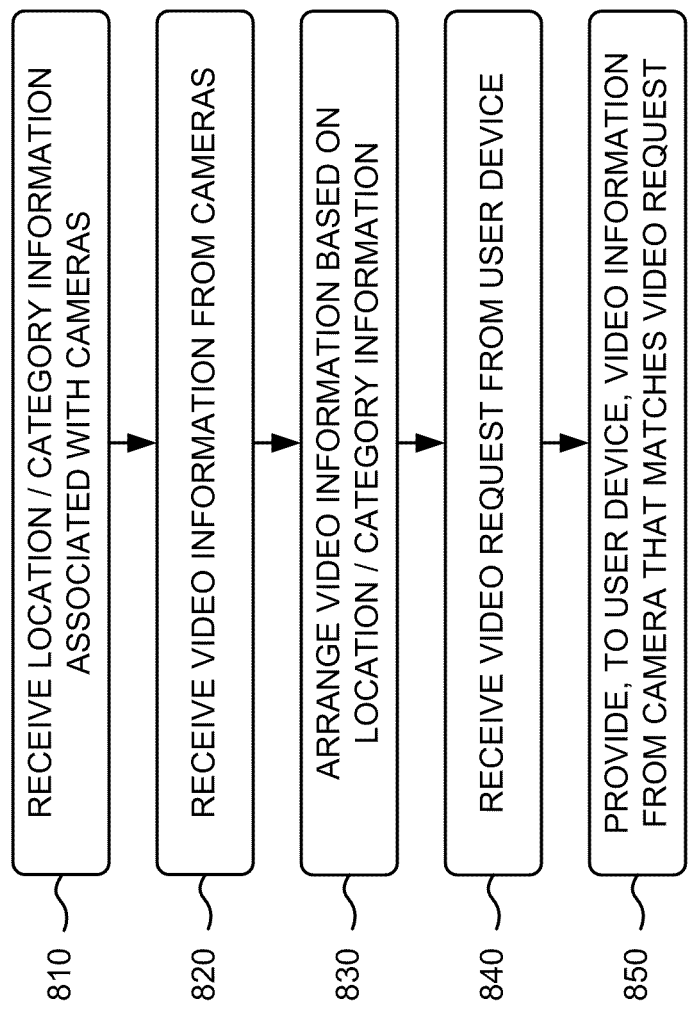
FIGS. 8-10 are flow charts of an exemplary process for accessing web-based cameras arranged by category according to implementations described herein.
Figure 9:
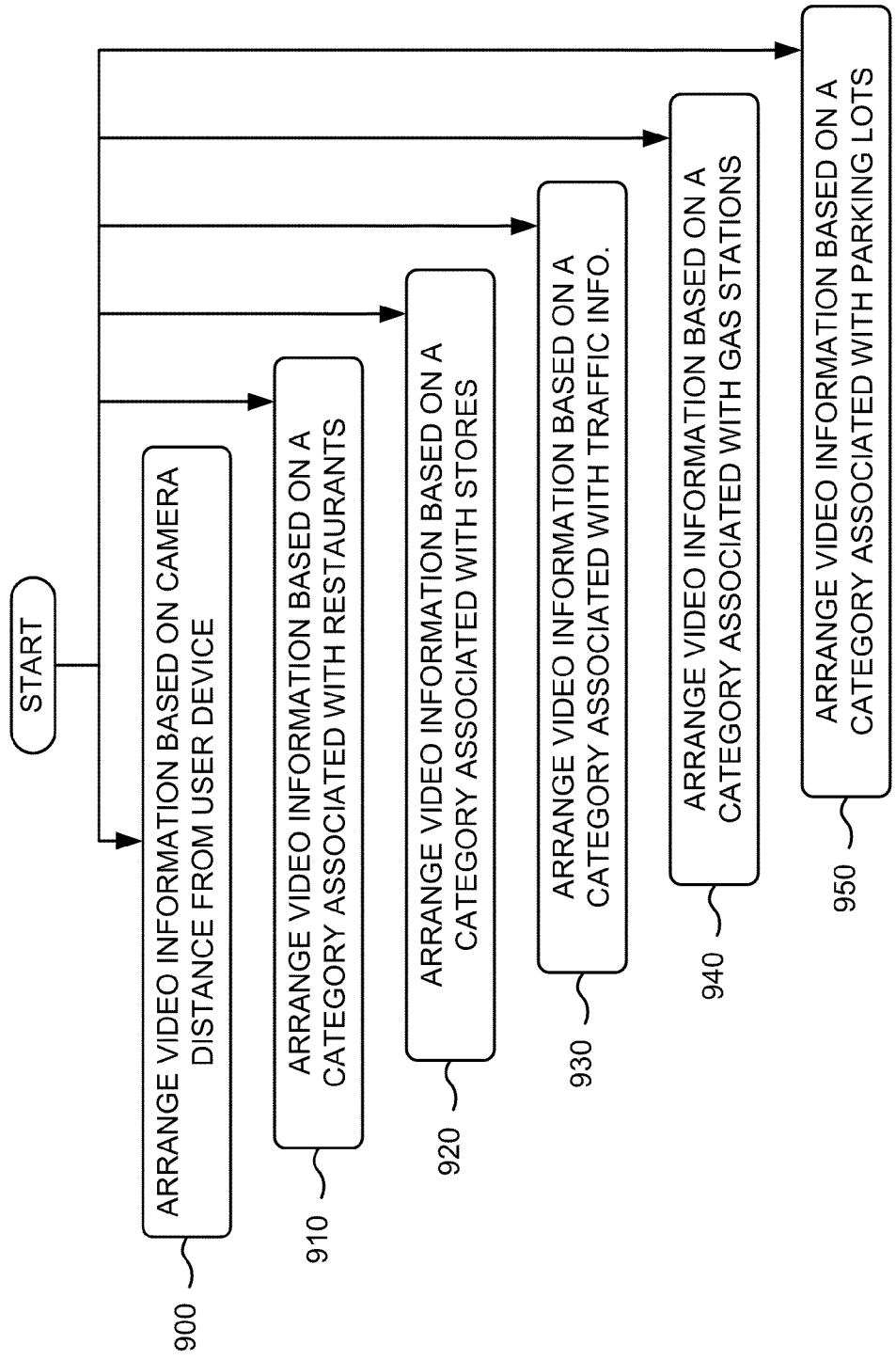
Figure 10:
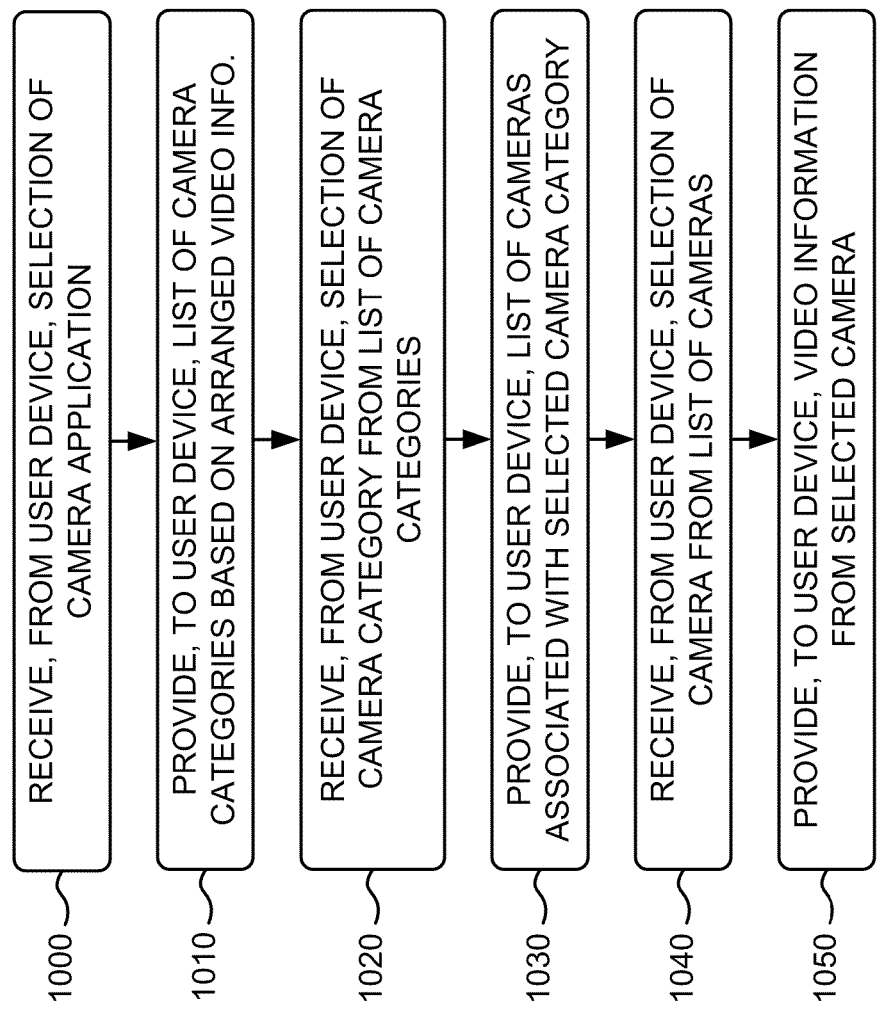

FIGS. 8-10 are flow charts of an exemplary process 800 for accessing web-based cameras arranged by category according to implementations described herein. In one implementation, process 800 may be performed by server 130. In another implementation, some or all of process 800 may be performed by another device or group of devices, including or excluding server 130.

As illustrated in FIG. 8, process 800 may include receiving location information and/or category information associated with cameras (block 810), and receiving video information from the cameras (block 820). For example, in implementations described above in connection with FIG. 5, cameras 120-1 through 120-N may provide captured scenes 520-1 through 520-N (e.g., as video streams) to server 130. Cameras 120-1 through 120-N may provide location information and/or category information 530-1 through 530-N to server 130. Location/category information 530-1 through 530-N may include locations associated with cameras 120-1 through 120-N (e.g., GPS coordinates associated with cameras 120-1 through 120-N); identification information (e.g., identifying cameras 120-1 through 120-N); categories associated with cameras 120-1 through 120-N (e.g., categories, such as traffic cameras, cameras in stores, gas station cameras, parking lot cameras, cameras in bars, cameras in restaurants, etc.); etc.

As further shown in FIG. 8, the video information may be arranged based on the location information and/or the category information (block 830). For example, in implementations described above in connection with FIG. 5, server 130 may arrange captured scenes 520-1 through 520-N based on location/category information 530-1 through 530-N. In one example, server 130 may group video feeds from all traffic cameras 120 into a category, may group video feeds from all parking lot cameras 120 into a category, may group video feeds from all gas station cameras 120 into a category, etc. In another example, cameras 120-1 through 120-N may be registered with server 130 and may provide location/category information 530-1 through 530-N to server 130 prior to server 130 receiving captured scenes 520-1 through 520-N. Such an arrangement may enable server 130 to categorize cameras 120-1 through 120-N prior to server 130 receiving captured scenes 520-1 through 520-N. In still another example, server 130 may not receive category information from cameras 120-1 through 120-N, but may receive location information from cameras 120-1 through 120-N. Server 130 may utilize the location information to categorize cameras 120-1 through 120-N.

Returning to FIG. 8, process 800 may include receiving a video request from a user device (block 840), and providing, to the user device, video information from a camera that matches the video request (block 850). For example, in implementations described above in connection with FIG. 5, user device 110 may provide video request 540 to server 130, and server 130 may receive video request 540. Video request 540 may include a request for video from a particular one of cameras 120. Server 130 may provide, to user device 110, video information 550 associated with a camera 120 that matches video request 540. Video information 550 may include a video feed from the matching camera 120. User device 110 may provide video information 550 for display to a user. In one example, video request 540 may include a request for video from a parking lot that is closest to user device 110. Server 130 may determine which cameras 120 are associated with parking lots, and may determine distances between the parking lot cameras 120 and user device 110 (e.g., based on GPS coordinates associated with user device 110 and the parking lot cameras 120). Server 130 may provide user device 110 with a video feed from the parking lot camera 120 that is determined to be closest to user device 110.

Process block 830 may include the process blocks illustrated in FIG. 9. As shown in FIG. 9, process block 830 may include one or more of arranging the video information based on camera distance from the user device (block 900), arranging the video information based on a category associated with restaurants (block 910), arranging the video information based on a category associated with stores (block 920), arranging the video information based on a category associated with traffic information (block 930), arranging the video information based on a category associated with gas stations (block 940), or arranging the video information based on a category associated with parking lots (block 950).

For example, in implementations described above in connection with FIGS. 6A and 6B, if the user selects application 605, user interface 600 may present categorized cameras that are proximate to user device 110. In one example, server 130 may determine cameras 120 that are proximate to user device 110 (e.g., based on GPS coordinates associated with user device 110 and cameras 120), may categorize the determined cameras 120, and may provide the categories to user device 110. In another example, user interface 600 may present a gas station cameras category 610, a traffic cameras category 615, a mall/store cameras category 620, a restaurant cameras category 625, a parking lot cameras category, and/or other categories.

Process blocks 840 and 850 may include the process blocks illustrated in FIG. 10. As shown in FIG. 10, process blocks 840 and 850 may include receiving, from the user device, selection of a camera application (block 1000), and providing, to the user device, a list of camera categories based on the arranged video information (block 1010). For example, in implementations described above in connection with FIGS. 7A and 7B, server 130 may provide available camera information 705 to the STB, and the STB may store available camera information 705. Available camera information 705 may include information associated with cameras 120, such as, for example, locations of cameras 120, categories associated with cameras 120, etc. The STB may provide camera application 710 for display on the television. Camera application 710 (e.g., when selected by the user via the remote control) may enable the user to view, manipulate, and/or select available camera information 705. In one example, if the user selects (e.g., via the remote control) camera application 710, the STB may provide camera categories 715 for the display on the television. Camera categories 715 may include a categorical listing of cameras 120 that may be accessed by the user.

As further shown in FIG. 10, process blocks 840 and 850 may include receiving, from the user device, a selection of a camera category from the list of camera categories (block 1020), and providing, to the user device, a list of cameras associated with the selected camera category (block 1030). For example, in implementations described above in connection with FIGS. 7B and 7C, server 130 may receive category selection 720, may determine cameras 120 associated with category selection 720, and may provide the determined cameras 120 (e.g., associated with category selection 720) to the STB, as indicated by reference number 725. In one example, if the user (e.g., via the remote control) selects "Bars" from camera categories 715, server 130 may provide a list 730 of cameras 120 associated with "Bars" to the STB.

Returning to FIG. 10, process blocks 840 and 850 may include receiving, from the user device, selection of a camera from the list of cameras (block 1040), and providing, to the user device, video information from the selected camera (block 1050). For example, in implementations described above in connection with FIGS. 7C and 7D, if the user selects (e.g., via the remote control) a camera (e.g., camera 120-1) associated with "Bar 1" from list 730 of cameras 120, the STB may provide information associated with the selected camera to server 130, as indicated by reference number 735. Based on selected camera 735, server 130 may receive captured scene 740 (e.g., a video stream) from camera 120-1. Captured scene 740 may include video information 745 associated with "Bar 1." Video information 745 may include continuously captured video provided by camera 120-1 or periodically captured video provided by camera 120-1. Server 130 may provide video information 745 to the STB, and the STB may provide video information 745 for display on the television, as indicated by reference number 750.

Systems and/or methods described herein may enable a user device to access web-based cameras that are arranged by category (e.g., based on the locations of the user device and/or the cameras). In one implementation, for example, the systems and/or methods may receive location information and/or category information associated with multiple cameras, and may receive video information from the cameras. The systems and/or methods may arrange the video information based on the location information and/or the category information associated with the cameras. The systems and/or methods may receive a video request from a user device, and may provide, to the user device, video information from a camera that matches the video request.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 8-10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computing device and from a plurality of cameras, first location information associated with the plurality of cameras;
   determining, by the computing device, category information associated with the plurality of cameras based on the first location information associated with the plurality of cameras and based on second location information associated with locations;
   receiving, by the computing device, video feeds from the plurality of cameras;
   receiving, by the computing device and from a user device, a video request, the video request including third location information of the user device;
   determining, by the computing device, an arrangement of the video feeds based on the category information associated with the plurality of cameras and based on the third location information of the user device;
   providing, by the computing device and to the user device, a list of camera categories based on the arrangement of the video feeds,
      the list of camera categories including:
         a first category that corresponds to a first type of location and two or more first cameras, of the plurality of cameras, that are located in one or more first locations of the first type of location,
            the one or more first locations of the first type of location being one or more entertainment or dining venues identified based on a previously provided preference of a user of the user device, and
         a second category that corresponds to a second type of location and one or more second cameras, of the plurality of cameras, that are located in one or more second locations of the second type of location, and
      the second type of location being different from the first type of location;
   receiving, by the computing device and from the user device, information regarding a first selection of the first category;
   determining, by the computing device, a first listing of the two or more first cameras that is arranged based on the first selection of the first category;
   providing, by the computing device and to the user device, the first listing of the two or more first cameras based on the first selection of the first category,
   receiving, by the computing device and from the user device, information regarding a second selection of a first camera of the two or more first cameras,
      the first camera capturing a scene of an interior of a venue of the one or more entertainment or dining venues;
   providing, by the computing device, to the user device, and based on the second selection of the first camera, first video information that includes the scene of the interior of the venue;
   receiving, by the computing device, information regarding a third selection of the second category;
   determining, by the computing device, a second listing of the one or more second cameras that is arranged based on the third selection of the second category;
   providing, by the computing device and to the user device, the second listing of the one or more second cameras based on the third selection of the second category;
   receiving, by the computing device and from the user device, information regarding a fourth selection of a second camera of the one or more second cameras; and
   providing, by the computing device, to the user device, and based on the fourth selection of the second camera, second video information that includes a scene of a second location of the one or more second locations.

2. The method of claim 1, where the third location information includes global positioning system (GPS) coordinates associated with the user device.

3. The method of claim 1,
where determining the arrangement of the video feeds includes one or more of:
arranging the video feeds based on respective distances of the plurality of cameras from the user device,
grouping one or more of the video feeds based on a category associated with restaurants,
grouping one or more of the video feeds based on a category associated with stores,
grouping one or more of the video feeds based on a category associated with traffic information,
grouping one or more of the video feeds based on a category associated with gas stations, or
grouping one or more of the video feeds based on a category associated with parking lots, and
where the first category includes the category associated with restaurants.

4. The method of claim 1, where providing the list of camera categories includes:
receiving, from the user device, a selection of a camera application; and
providing, to the user device and after receiving the selection of the camera application, the list of camera categories based on the arrangement of the video feeds.

5. The method of claim 1, further comprising:
identifying, based on the second selection of the first camera, a video feed, of the video feeds, that is from the first camera,
where providing the first video information comprises:
providing, to the user device, the video feed as the first video information.

6. The method of claim 1, where determining the arrangement of the video feeds includes:
determining categories for the plurality of cameras based on the category information associated with the plurality of cameras; and
determining the arrangement of the video feeds based on the categories and based on the third location information of the user device,
the categories including the first category and the second category.

7. The method of claim 1, where the user device includes one or more of:
a radiotelephone, a personal communications system (PCS) terminal,
a personal digital assistant (PDA),
a portable media player,
a laptop computer,
a personal computer,
a global positioning system (GPS) navigation device,
a set-top box (STB), or
a television.

8. The method of claim 1, where the third location information includes an Internet protocol (IP) address of the user device.

9. A device comprising:
one or more processors to:
receive, from a plurality of cameras, first location information associated with the plurality of cameras,
determine category information associated with the plurality of cameras based on the first location information associated with the plurality of cameras and based on second location information associated with locations,
receive video feeds from the plurality of cameras,
receive, from a user device, a video request,
the video request including third location information of the user device;
provide, to the user device, a list of camera categories based on the category information associated with the plurality of cameras and based on the third location information of the user device,
the list of camera categories including:
a first category that corresponds to a first type of location and two or more first cameras, of the plurality of cameras, that are located in one or more first locations of the first type of location,
the one or more first locations of the first type of location being one or more entertainment or dining venues identified based on a previously provided preference of a user of the user device, and
a second category that corresponds to a second type of location and one or more second cameras, of the plurality of cameras, that are located in one or more second locations of the second type of location, and
the second type of location being different from the first type of location,
receive, from the user device, information regarding a first selection of the first category,
determine a first listing of the two or more first cameras that is arranged based on the first selection of the first category;
provide, to the user device, the first listing of the two or more first cameras based on the first selection of the first category,
receive, from the user device, information regarding a second selection of a first camera of the two or more first cameras,
the first camera capturing a scene of an interior of a venue of the one or more entertainment or dining venues,
provide, to the user device and based on the second selection of the first camera, first video information that includes the scene of the interior of the venue,
receive information regarding a third selection of the second category;
determine a second listing of the one or more second cameras that is arranged based on the third selection of the second category;
provide, to the user device, the second listing of the one or more second cameras based on the third selection of the second category;
receive, from the user device, information regarding a fourth selection of a second camera of the one or more second cameras; and
provide, to the user device and based on the fourth selection of the second camera, second video information that includes a scene of a second location of the one or more second locations.

10. The device of claim 9, where, when providing the first video information, the one or more processors are to:
provide, to the user device and based on the second selection of the camera, a video feed, of the video feeds, that is from the first camera as the first video information.

11. The device of claim 10, where, when providing the video feed, the one or more processors are to:
   identify the first camera, of the plurality of cameras, based on the second selection of the first camera,
   identify the video feed based on identifying the first camera, and
   provide, to the user device, the video feed.

12. The device of claim 9, where the third location information includes global positioning system (GPS) coordinates associated with the user device.

13. The device of claim 9, where the second category includes one of:
   a category associated with stores,
   a category associated with malls,
   a category associated with traffic information,
   a category associated with gas stations, or
   a category associated with parking lots.

14. The device of claim 9, where the third location information of the user device is determined via an Internet protocol (IP) address associated with the user device.

15. A non-transitory computer-readable medium storing instructions, the instructions comprising:
   one or more instructions that, when executed by at least one processor of a device, cause the at least one processor to:
      receive, from a plurality of cameras, first location information associated with the plurality of cameras;
      determine category information associated with the plurality of cameras based on the first location information associated with the plurality of cameras and based on second location information associated with locations;
      receive video feeds from the plurality of cameras;
      receive, from a user device, a video request,
         the video request including third location information of the user device;
      provide, to the user device, a list of camera categories based on the category information associated with the plurality of cameras and based on the third location information of the user device,
         the list of camera categories including:
            a first category that corresponds to a first type of location and two or more first cameras, of the plurality of cameras, that are located in one or more first locations of the first type of location,
               the one or more first locations of the first type of location being one or more entertainment or dining venues identified based on a previously provided preference of a user of the user device, and
            a second category that corresponds to a second type of location and one or more second cameras, of the plurality of cameras, that are located in one or more second locations of the second type of location, and
            the second type of location being different from the first type of location;
      receive, from the user device, information regarding a first selection of the first category;
      determine a first listing of the two or more first cameras that is arranged based on the first selection of the first category;
      provide, to the user device, the first listing of the two or more first cameras based on the first selection of the first category,
      receive, from the user device, information regarding a second selection of a first camera of the two or more first cameras,
         the first camera capturing a scene of an interior of a venue of the one or more entertainment or dining venues;
      provide, to the user device, and based on the second selection of the first camera, video information that includes the scene of the interior of the venue;
      receive information regarding a third selection of the second category;
      determine a second listing of the one or more second cameras that is arranged based on the third selection of the second category;
      provide, to the user device, the second listing of the one or more second cameras based on the third selection of the second category;
      receive, from the user device, information regarding a fourth selection of a second camera of the one or more second cameras; and
      provide, to the user device and based on the fourth selection of the second camera, second video information that includes a scene of a second location of the one or more second locations.

16. The non-transitory computer-readable medium of claim 15, where the device includes a server device connected to the user device and the plurality of cameras via a network.

17. The non-transitory computer-readable medium of claim 15, where the one or more instructions to provide the list of camera categories include:
   one or more instructions that, when executed by the at least one processor, cause the at least one processor to:
      receive, from the user device, a selection of a camera application, and
      provide, to the user device and after the selection of the camera application, the list of camera categories.

18. The non-transitory computer-readable medium of claim 15, where the one or more second cameras include parking lot cameras.

19. The non-transitory computer-readable medium of claim 15, where the one or more instructions to provide the list of camera categories include:
   one or more instructions that, when executed by the at least one processor, cause the at least one processor to:
      receive, from the user device, information regarding a selection to view the video feeds within a particular distance from the user device, and
      provide, to the user device, the list of camera categories based on the category information associated with the plurality of cameras, based on the third location information of the user device, and based on the selection to view the video feeds within the particular distance from the user device.

* * * * *